Jan. 28, 1969 L. W. PINAIRE 3,424,382
SPLIT PLUG VECTORABLE EXHAUST NOZZLE
Filed May 20, 1966
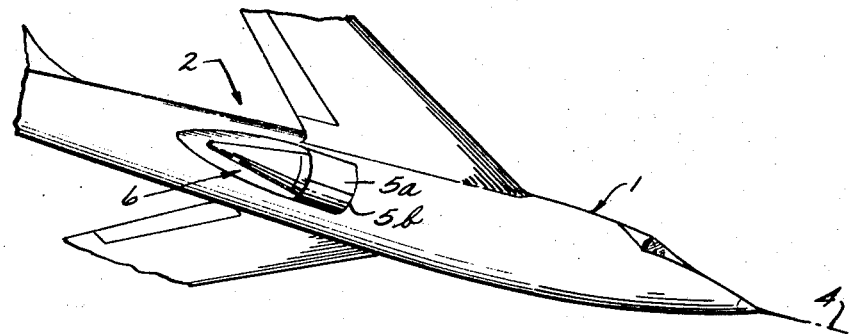
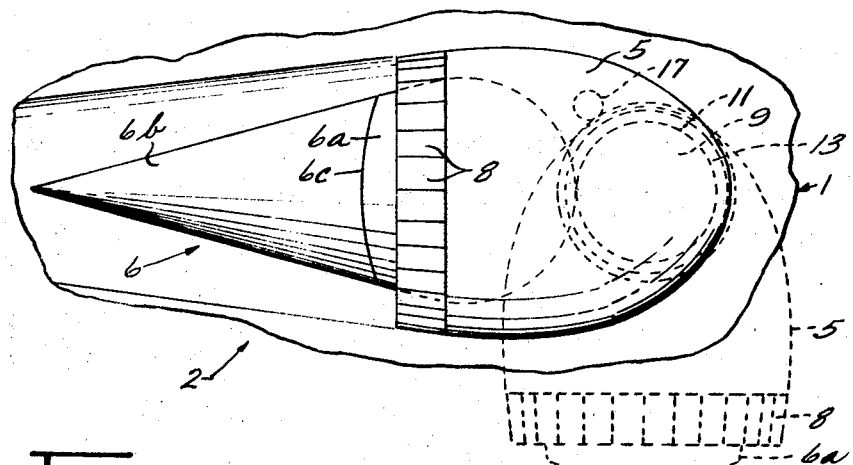
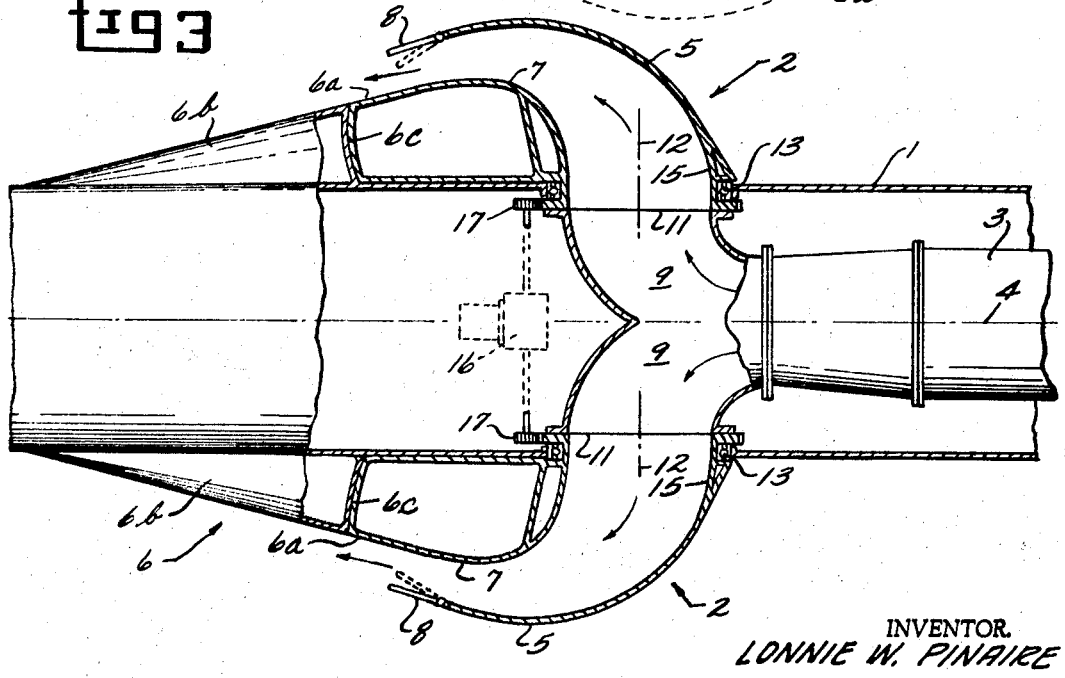
INVENTOR.
LONNIE W. PINAIRE
ATTORNEY

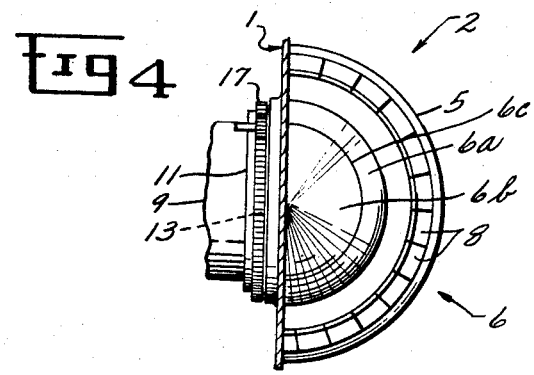
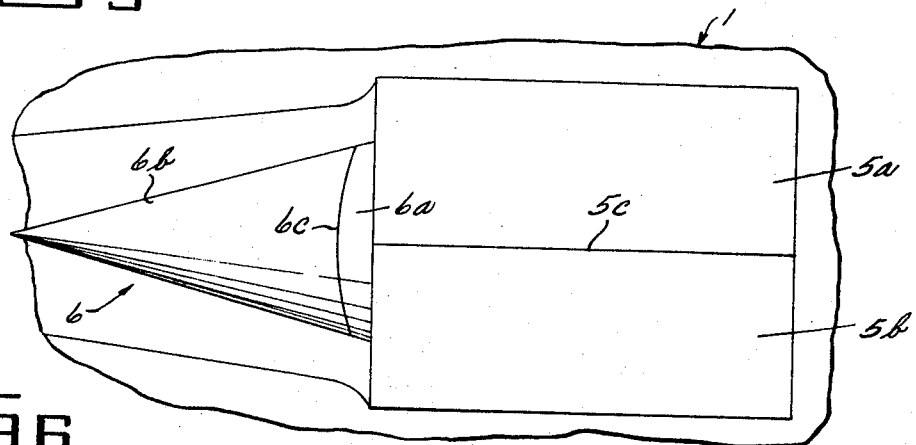
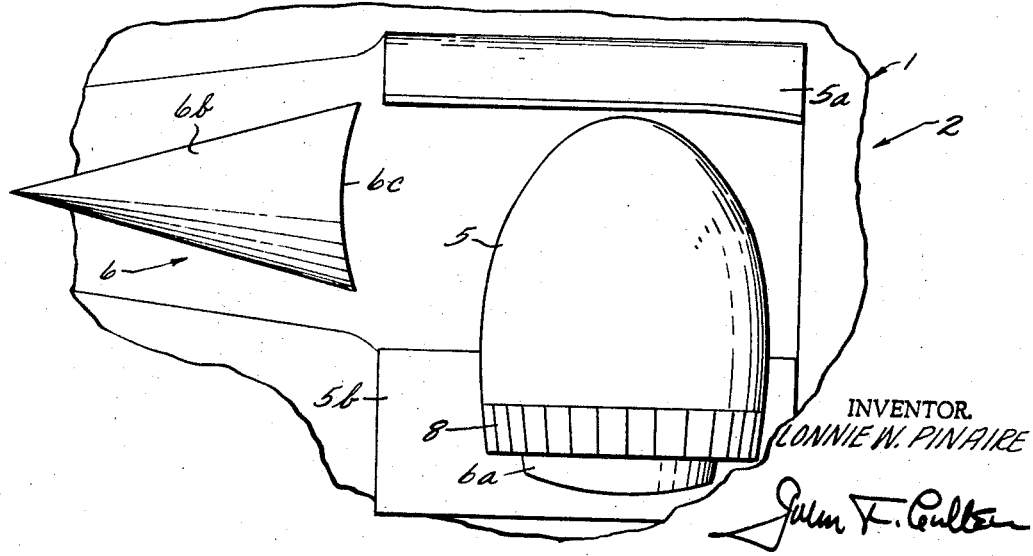
INVENTOR.
LONNIE W. PINAIRE
ATTORNEY

United States Patent Office 3,424,382
Patented Jan. 28, 1969

3,424,382
SPLIT PLUG VECTORABLE EXHAUST NOZZLE
Lonnie W. Pinaire, Loveland, Ohio, assignor to General
Electric Company, a corporation of New York
Filed May 20, 1966, Ser. No. 558,535
U.S. Cl. 239—265.25                      6 Claims
Int. Cl. B64c 15/12

ABSTRACT OF THE DISCLOSURE

A split plug vectorable exhaust nozzle structure having a pair of nozzles symmetrically mounted to an aircraft for rotation thereon, a nozzle plug extends into the throat of each nozzle and has a forward portion movable with the nozzle and a fixed aft portion. The fixed and movable nozzle plug portions of each nozzle are separable along a surface of revolution taken about the rotational axis of the exhaust nozzle. A movable fairing structure may be provided which opens to allow unimpaired rotation of the nozzle structure.

---

This invention relates to a movable exhaust nozzle structure and, more particularly, to a thrust vectorable nozzle for use in an aircraft capable of vertical takeoff and landing or short takeoff and landing (V/STOL).

In aircraft of this character, V/STOL capability is achieved by fitting the cruise engine or engines with movable exhaust nozzles so that the exhaust jets can be directed rearward for cruise operation or angled downward for performing the V/STOL function. The aircraft may be equipped with conventional gas generators to provide the necessary thrust jets. Generally, an equal number of exhaust gas outlets are provided on each side of the aircraft in the form of twin nozzles which may be rotatable cascade members, elbow-shaped nozzles, or any other suitable conduits which efficiently conduct the exhaust gases in the desired direction.

One of the main problems associated with nozzle means that are used to provide thrust in widely varying directions from forward flight to vertical lift (and in some instances, from forward flight to reverse) has been the inability to satisfactorily provide structure which enables the nozzle to present a smooth, unobstructed surface with the aircraft fairing or skin in the cruise position and also be adaptable to redirect, by rotation or otherwise, the exhaust gases in different directions without disturbing the contours of the aircraft to an unsatisfactory degree such that drag is created and other aerodynamic problems are encountered.

One object of this invention is to provide a movable nozzle structure which permits rotational movement of a nozzle from a cruise position through a large arc into a V/STOL position.

Another object is to provide such a structure which employs retractable fairing about the nozzle structure in combination with a split plug nozzle.

Another object is to provide such structure which permits minimum interference or drag in the cruise position, that is rotatable through a wide range without jamming.

Briefly stated then, the invention is directed to rotatable nozzle structure especially adaptable for use with aircraft having exhaust gas generator means and at least twin symmetrical exhaust gas outlets connected to the gas generator means for providing thrust in widely ranging directions. A movable exhaust nozzle structure is provided for each gas generator outlet, and each exhaust system includes what may be termed one-half of a conventional nozzle plug split apart to facilitate vectoring and to provide a clean installation configuration. The plug is divided intermediate along its length in an arc about the axis of rotation of the nozzle. The rearward portion of the plug is stationary and fixed to the fuselage. The forward portion of the plug rotates with the nozzle to maintain the primary throat. Retractable fairing members may enclose each nozzle in a cruise position, but may be swung open in the manner of bomb-bay doors to permit rotation of the exhaust system, which is carried by bearings fixed to the aircraft, downwardly into a vertical thrust position.

Additional objects of this invention, its advantages, scope and the manner in which it may be practiced will become more readily apparent to persons conversant with the art from the following detailed description of an exemplary embodiment taken in conjunction with the subjoined claims and the drawings of which:

FIGURE 1 is a perspective view of a typical fuselage installation with the nozzle shown in the cruise position.
FIGURE 2 is a side view of a rotatable nozzle system;
FIGURE 3 is a top view of a rotatable nozzle exhaust system;
FIGURE 4 is an aft view of the rotatable nozzle system shown in FIGURE 2;
FIGURE 5 is a side view of a rotatable nozzle system partially enclosed by retractable fairing members; and
FIGURE 6 is a view similar to FIGURE 5 with the exhaust system rotated to a vertical thrust position after the retractable fairing members have been opened.

While the invention is equally applicable to pod mounted installations, it is, for convenience, described here in connection with a typical fuselage installation. Referring first to FIGURE 1, there is shown a general perspective view of an aircraft 1 employing an embodiment of the instant invention disposed in its cruise or forward flight position. A nozzle structure, generally indicated at 2, is provided to direct the gases issuing from a gas generator 3 directly rearward to provide normal cruise thrust. As shown in the aircraft illustrated, a plurality of plural nozzles 2 may be provided on the aircraft and symmetrically disposed about a longitudinal center line 4 through the aircraft. The symmetrical arrangement, of course, is preferred to provide a balanced thrust in all positions and to maintain the aircraft attitude unchanged by the off-center location of the nozzle structures. It will be understood that any even number of movable nozzle structures that are symmetrically arranged about the longitudinal center line 4 may be used with a given aircraft. On the aircraft illustrated in FIGURE 1, movable fairing members 5a and 5b, which blend aerodynamically with the fuselage body, partially enclose the nozzle structure in the cruise position.

Referring now to FIGURE 2, a side view of the exhaust system is presented with the fairing members not shown. The movable portion of the exhaust system, indicated generally at 6, includes a forward portion 6a of a plug. An aft portion 6b of the plug is fixed to this fuselage. Variable flaps 8 may be carried at the end of the nozzle 2 for area and thrust control purposes in any nozzle position.

The interior structure of the nozzle may be understood by simultaneous consideration of FIGURES 2 and 3. Hot gas from a suitable gas generator 3 flows through a conduit 9 through a rotatable coupling 11 into the movable nozzle structure 5. The nozzle 2 is mounted for rotation about an axis 12 which is the center of rotation of the rotatable coupling 11, which includes a ring bearing member 13. As seen in FIGURE 3 the axis 12 extends at right angles or perpendicular to the plane of the ring bearing 13. The path of the hot gases through the nozzles is defined by the outer surface of the forward portion 6a of the plug member and the outer nozzle housing 5. A short connecting piece 15 provides a smooth transition for the hot gas flow between the circular opening through the rotatable coupling 11 and the outer housing 5.

The movable portion 6a of the plug is formed by shaping a continuation of the structure forming the housing 7 which is mounted on the rotatable coupling 11 so that they form a unitary structure and rotate together.

Suitable motor means 16 may be provided to rotate the nozzles by means of a conventional gear arrangement 17 and, in the installation shown, are adapted to rotate the twin nozzles downwardly or upwardly simultaneously and in position synchronism in order to maintain the aircraft stability during transition between the cruise position and V/STOL position. The general configuration of each nozzle system is evident from a consideration of FIGURES 2, 3, and 4. FIGURE 4 shows an exhaust system in the cruise position as it would be arranged on the right side of an aircraft and viewed from the rear.

As noted above, in the cruise position shown in FIGURE 1, the nozzle system is partially enclosed by fairing members 5a and 5b which, when closed, closely adjoin one another, as indicated by the line 5c, to present a smooth surface compatible with and blending into the aerodynamic shape of the fuselage.

FIGURES 5 and 6 show only the nozzle system and the fairing members 5a and 5b to illustrate the manner in which they cooperate when the exhaust system is in the cruise and V/STOL positions respectively. In FIGURE 5, the fairings are closed, and exhaust is directed rearwardly for cruise operation. To achieve the vertical thrust operation position shown in FIGURE 6, the upper fairing member 5a has been swung upwardly and outwardly away from the aircraft fuselage. In a like manner the lower fairing member 5b has been opened downwardly to permit rotation of the exhaust system into the position shown. The nozzle is then rotated by the motor 16 about the axis 12 carrying with it the plug portion 6a which separates from the plug portion 6b along the line 6c. The line 6c is formed as a radius of the axis of rotation 12. To return to the cruise position, the movable portion of the exhaust system is rotated back into the position shown in FIGURES 1, 2, and 5, and the movable fairing member 5a and 5b are subsequently reclosed. It will be understood, of course, that positions intermediate the cruise position and the vertical thrust position may be assumed to provide both sustaining and propulsive thrust for the aircraft.

While there has been described a preferred form of the invention, obvious equivalent variations are possible in light of the above teachings. It is therefore to be understood that within the scope of the appended claims, the invention may be practiced otherwise than as specifically described, and the claims are intended to cover such equivalent variations.

What I claim as new and desire to secure by Letters Patent of the United States is:

1. For use with an aircraft having gas generator means and at least twin outlets for the aircraft and connected thereto, structure for each gas outlet comprising:
    a bearing member disposed on the aircraft;
    a nozzle mounted for movement about an axis perpendicular to and passing through the center of said bearing;
    a split nozzle plug having a forward movable portion and an aft fixed portion said movable portion extending into the throat of said nozzle and connected to move with said nozzle; and
    said fixed and movable plug portions meeting along surfaces in closely abutting relationship, said surfaces defined by radii about the axis around which the exhaust nozzle moves.

2. Apparatus as described in claim 1 wherein said nozzles are symmetrical about a longitudinal line through the aircraft.

3. Apparatus as described in claim 2 having means to move said nozzles.

4. For use with an aircraft having gas generator means and at least twin outlets for the aircraft and connected thereto, structure for each gas outlet comprising:
    a bearing member disposed on the aircraft;
    an exhaust nozzles mounted for movement about an axis perpendicular to and passing through the center of said bearing;
    a split nozzle plug having a forward movable portion and an aft fixed portion said movable portion extending into the throat of said nozzle and connected to move with said nozzle;
    said fixed and movable plug portions meeting along surfaces in closely abutting relationship, said surfaces defined by radii about the axis around which the exhaust nozzle moves; and
    said movable nozzle being at least partially enclosed by movable fairing means disposed in a first, closed position, when said movable nozzle is in a cruise position, said movable fairing means being adapted to open to a second position to expose said movable nozzle structure and permit said movable nozzle structure unimpaired movement about the axis through intermediate positions to a vertical thrust position.

5. Apparatus as described in claim 4 wherein said nozzles are symmetrical about a longitudinal line through the aircraft.

6. Apparatus as described in claim 5 having means to move said nozzles.

References Cited

UNITED STATES PATENTS

| | | | |
|---|---|---|---|
| 3,025,667 | 3/1962 | Moorehead | 239—265.25 |
| 3,117,750 | 1/1964 | Snell. | |
| 3,209,535 | 10/1965 | Marchant et al. | 239—265.25 |
| 3,248,877 | 5/1966 | Alderson et al. | 244—12 X |
| 3,263,417 | 8/1966 | Hooker | 60—271 |
| 3,266,245 | 8/1966 | Mullins | 239—265.35 X |
| 3,271,948 | 9/1966 | Fuller | 239—265.19 X |
| 3,323,758 | 6/1967 | Millward | 244—52 |

EVERETT W. KIRBY, *Primary Examiner.*

U.S. Cl. X.R.

239—265.35, 265.39